J. R. FLETCHER.
SWIVEL KNOB SPINDLE.
APPLICATION FILED JUNE 24, 1909.

939,191. Patented Nov. 2, 1909.

Witnesses:
Fred M. Dannenfelser.

Inventor
J. R. FLETCHER.
By his Attorneys

UNITED STATES PATENT OFFICE.

JAMES ROBERT FLETCHER, OF NEW BRITAIN, CONNECTICUT, ASSIGNOR TO P. & F. CORBIN, OF NEW BRITAIN, CONNECTICUT, A CORPORATION OF CONNECTICUT.

SWIVEL KNOB-SPINDLE.

939,191.   Specification of Letters Patent.   Patented Nov. 2, 1909.

Application filed June 24, 1909. Serial No. 503,976.

*To all whom it may concern:*

Be it known that I, JAMES ROBERT FLETCHER, a citizen of the United States, residing at New Britain, county of Hartford, State of Connecticut, have invented certain new and useful Improvements in Swivel Knob-Spindles, of which the following is a full, clear, and exact description.

My invention relates to an improved swivel spindle for door locks and latches.

In certain types of spindles it is desirable to have the spindle of two diameters; for example, the middle, roll-back carrying, portion of the spindle should be in some instances $\frac{3}{8}$ of an inch in diameter, while the end, knob carrying, portions should be $\frac{5}{16}$ of an inch in diameter. It is to this type of a spindle that my invention particularly relates.

Heretofore such spindles have been made from solid metal involving relatively expensive manufacture by reason of the steps necessary to produce the finished article.

By my invention an ordinary swivel spindle of one diameter may be quickly and easily transformed into a spindle of two diameters at a minimum of expense and labor.

Figure 1:
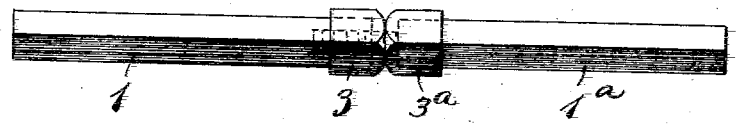
Figure 2:
Figure 3:
Figure 4:

In the drawings, Figure 1 is a side elevation of my improved spindle. Fig. 2 is a perspective view of a detail. Fig. 3 is an end view of the same detail. Fig. 4 is a side view of one of the spindle ends before the cap is applied.

1—1ª are the main spindle ends, connected end to end by means of a screw 2, which is preferably formed integrally with one spindle end, for example, 1ª. This screw is threaded into an opening in the end of the adjacent spindle end 1.

3—3ª are caps which may be quickly and easily formed by a suitable machine and are adapted to fit snugly over the adjacent ends of the parts 1—1ª, each of said caps being centrally perforated to provide a passage for the screw 2. When it is desired to transform a spindle of one size throughout, into a spindle of differential diameters, the two ends 1—1ª are unscrewed and separated from each other and the caps 3—3ª are driven on to said formerly connected ends, after which said ends are again connected by screw 2. The thickness of the metal forming each cap 3 is sufficient to give to the middle portion of the spindle the additional thickness desired. For example, where the knob carrying portion of each spindle is of $\frac{5}{16}$ of an inch in diameter, the caps 3—3ª when applied will increase the diameter of the middle, or roll-back carrying portion to approximately $\frac{6}{16}$ or $\frac{3}{8}$. The end of each cap 3—3ª overstands the end of its respective spindle section, so that when the parts are assembled said caps cannot come off. By employing this means, great economies are not only effected in manufacture, but the maker can very easily transform the whole, or any part, of his stock of spindles of uniform diameter into spindles of two diameters.

What I claim is:

1. A spindle comprising two spindle ends, a screw arranged to connect said spindle ends in line, a separately formed cap on one spindle end, said cap when in place forming part of said spindle end and serving to increase the diameter thereof at the point where said cap is applied, a portion of said cap extending into the space between the two adjacent ends of the spindle to prevent endwise displacement of said cap.

2. In a spindle, two spindle ends of uniform diameter, a cap secured on the end of each of said parts, and means serving to connect said capped ends in line.

3. In a spindle, two spindle ends of uniform diameter, a cap on one end of each of said parts, and a screw serving to connect said capped ends in line, said screw passing through both caps and loosely fitting one of said spindle ends to permit the same to swivel.

4. In a spindle, two spindle ends of uniform diameter, a cap of corresponding cross-sectional outline secured on the end of each of said parts, and swivel means serving to connect said capped ends in line.

JAMES ROBERT FLETCHER.

Witnesses:
WM. V. COLLINS,
AGNES C. HEALEY.